United States Patent
Sternad et al.

(10) Patent No.: US 7,396,464 B2
(45) Date of Patent: Jul. 8, 2008

(54) FILTER COMPRISING ROTATABLE, DISK-SHAPED FILTER ELEMENTS

(75) Inventors: Werner Sternad, Stuttgart (DE); Walter Trosch, Stuttgart (DE); Lothar Schreiner, Stuttgart (DE)

(73) Assignee: Fraunhofer-Gesellschaft zur Forderung Der Angewandten Forschung E.V., Munich (DE)

( * ) Notice: Subject to any disclaimer, the term of this patent is extended or adjusted under 35 U.S.C. 154(b) by 320 days.

(21) Appl. No.: 10/494,689

(22) PCT Filed: Oct. 28, 2002

(86) PCT No.: PCT/EP02/12007

§ 371 (c)(1),
(2), (4) Date: Sep. 16, 2004

(87) PCT Pub. No.: WO03/039712

PCT Pub. Date: May 15, 2003

(65) Prior Publication Data

US 2005/0029183 A1     Feb. 10, 2005

(30) Foreign Application Priority Data

Nov. 7, 2001 (DE) ................................ 101 54 549

(51) Int. Cl.
*B01D 33/00* (2006.01)
(52) U.S. Cl. ................. 210/331; 210/346; 210/347
(58) Field of Classification Search ............. 210/345, 210/398, 399, 331, 346, 488, 321.84
See application file for complete search history.

(56) References Cited

U.S. PATENT DOCUMENTS

| 4,132,649 | A |   | 1/1979 | Croopnick et al. |
| 4,717,485 | A | * | 1/1988 | Brunsell et al. ............. 210/781 |
| 4,925,557 | A | * | 5/1990 | Ahlberg et al. .......... 210/321.68 |
| 4,936,986 | A | * | 6/1990 | Tarves, Jr. ............... 210/321.64 |
| 2003/0150822 | A1 |  | 8/2003 | Schliebmann et al. |
| 2003/0164327 | A1 |  | 9/2003 | Harms et al. |

FOREIGN PATENT DOCUMENTS

| DE | 65071 | 5/1967 |
| DE | WP 12D/124826 | 5/1967 |
| DE | 2 146 022 | 9/1971 |
| DE | 2146022 B1 | 9/1971 |
| DE | 197 17 448 | 10/1997 |
| DE | 197 17 448 A1 | 10/1997 |
| DE | 196 24 176 | 1/1998 |

(Continued)

*Primary Examiner*—David R. Sample
*Assistant Examiner*—Benjamin Kurtz
(74) *Attorney, Agent, or Firm*—Bateman IP Law Group

(57) ABSTRACT

The invention concerns a device for the separation of substances, in particular of solid substances, liquid phases of varied density and/or of gases, from a liquid, by rotation with several filtering elements, which permit the filtered liquid to pass through and which are rotatably supported around a rotational axis inside of a housing, said housing exhibiting an inlet opening for the liquid, at least one discharge opening for the heavy substances separated by rotation and at least one discharge opening for the filtered liquid. In accordance with the invention, a throughflow is provided, in the region or in the proximity of the rotational axis of the filtering elements, for substances exhibiting a density lower than that of the liquid.

12 Claims, 2 Drawing Sheets

FOREIGN PATENT DOCUMENTS

| | | |
|---|---|---|
| DE | 196 24 176 A1 | 1/1998 |
| DE | 196 47 512 | 5/1998 |
| DE | 196 47 512 A1 | 5/1998 |
| DE | 100 04 096 A1 | 1/2000 |
| DE | 100 04 096 | 8/2000 |
| DE | 100 04 09681 | 8/2001 |
| EP | 1 149 619 | 4/2000 |
| EP | 1149 619 A1 | 4/2000 |
| JP | 01270916 A * | 10/1989 |
| JP | 04273077 | 12/1992 |
| JP | 06121919 | 5/1994 |
| RU | 4208549/26 | 3/1987 |
| SU | 1 618 433 | 10/1987 |
| SU | 16118433 A1 | 10/1987 |

* cited by examiner

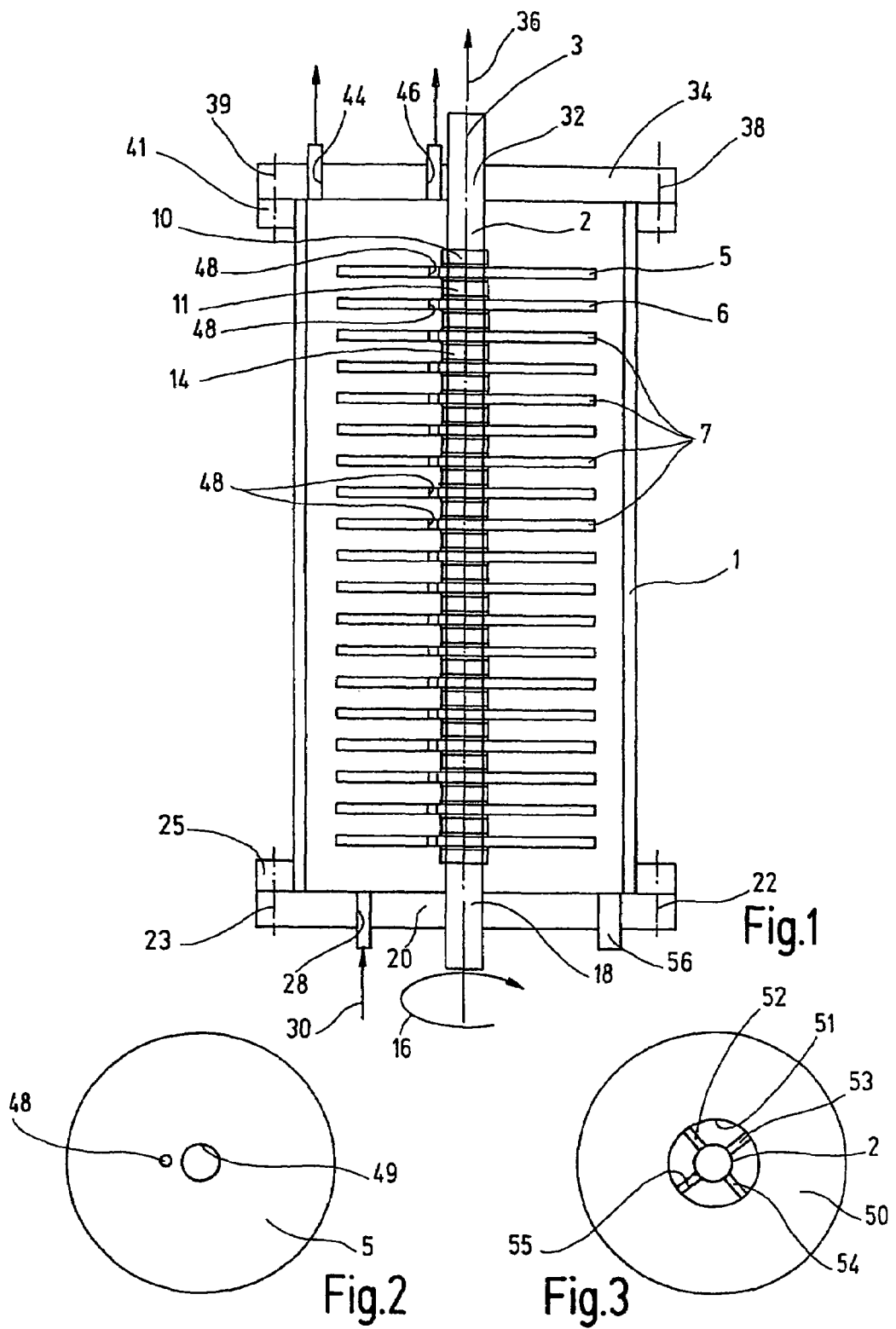

FILTER COMPRISING ROTATABLE, DISK-SHAPED FILTER ELEMENTS

RELATED APPLICATIONS

The present application is the U.S. National Phase of PCT Application PCT/EP02/12007, filed 28 Oct. 2002, claiming priority to German Patent Application No. 101 54 549.5, filed 7 Nov. 2001.

BACKGROUND

State of the Art

The invention concerns a device for the separation of substances, in particular of solid substances, of liquid phases of varying density and/or of gases, from a liquid, by rotation with several filter elements that allow the filtered liquid to pass through and that are rotatably mounted around an axis of rotation inside a housing that exhibits an inlet opening for the liquid, at least one discharge opening for the unfiltered components of the feed liquid separated by the rotation of the column of liquid and at least one discharge opening for the filtered liquid.

Such devices are exemplary in their application for wastewater treatment. In physical processes for the treatment of effluents, the wastewater contents undergo concentration enrichment by using various methods depending on the physical properties of the contents such as particle size, density and settling rate. Included amongst these are all separating processes that use solid auxiliary materials (such as in adsorption, filtration, ion exchange), liquid auxiliary agents (extraction), gaseous auxiliary agents (flotation, stripping), thermal energy (distillation, vaporization), gravity or centrifuging power (settling, floating). In particular, such devices find application in membrane separation technology, that is to say, in separating processes conducted with the assistance of membranes.

Membrane separation technology devices are used in many other industrial fields of application besides wastewater treatment. By using membranes with various pore sizes, particles ranging up to 5 nm can be separated. During the separation process, the solid substances can at least be accumulated directly on the membrane, while the filtered liquid passes through the membrane. The resulting concentration polarization leads to a sedimentary deposition—also known as membrane fouling—the formation of which can be influenced depending on the various types of filtration under operation. Classical modes of filtration operations are, on the one hand, the dead-end filtration (DEF) operation, and on the other hand, the cross-flow filtration (CFF) operation. These essentially differ from one another in that there is no forcible membrane feed flow in the case of DEF and therefore, the sedimentary deposition can accumulate uncontrollably, while in the case of CFF, the membrane is targeted for throughflow, whereby the sedimentary deposition accumulates in a controlled manner and can be restricted. In spite of this, a slow-down in filtrate current does occur after a longer period of filtration operation that is caused by the formation of sedimentary deposition that is reversible. It has been common practice, both in DEF as well as in CFF operations, to conduct periodic backwashing so as to obtain a constant flow of filtrates.

The typical specific power requirement resulting from such an operational mode as cross-flow ultrafiltration lies, for example, in the range of 3 to 7 $KWH/m^3$ with filtrate flow rates of 100 to 150 liters/$m^2$ per hour and with a transmembrane pressure of 3 to 5 bars. For a DEF operation, comparable values are yielded ranging from 0.1 to 0.5 $KWH/m^3$ with filtrate flow rates of 50 to 80 liters/$m^2$ per hour and with a pressure of 0.5 to 2 bars. With high volumetric flow rates and a low product value creation, which are indeed the case for municipal and industrial wastewater treatment or for the exploitation of drinking water from surface waters, this leads to high operating costs and renders such applications prohibitive on a widespread scale.

In the German patent DE 100 04 096, without prior publication, filtering discs are proposed as filtering elements that can be set into rotational operation, and based on their stacked manner of configuration, they ensure a very efficient filtering surface within a small space. The formation of sedimentary deposition on the filtering discs is exclusively influenced and controlled by the centrifugal forces exerted on the suspension during operation. Over the course of testing conducted in the framework of the current invention, it became evident that in the column of liquid, which is brought to rotate by the rotating filtering elements, light substances such as oils, lipids and dissolved gaseous components collect in the area of the shaft, in between the filtering elements where they cause problems (clogging of the filter surface).

The objective of this invention is therefore to create a device of the type initially depicted, in which the accumulation of light substances, between the filtering elements in the area or in the proximity of their rotational axis, is to be avoided. To this end, the device in accordance with the invention is to be simply constructed and cost-effectively manufacturable.

SUMMARY OF THE INVENTION

The objective is realized by a device for the separation of substances from a liquid. Cross-flow through the filtering elements is achieved by the application of a differential pressure. The rotational axis of the filtering elements is basically and preferably vertically arranged in order to best exploit the lifting effect on the light substances in countering the forces of gravity. The throughflow ensures that the light substances, collecting during the operation of the device between the filtering elements in the area or in the proximity of their rotational axis, can wander through the housing. In the case of substances with a density lower than that of the liquid, we are dealing with light substances such as gases, oils, lipids or gasoline, which, notwithstanding the filterable component, do not pass through the filtering elements.

A preferred exemplary embodiment of the device is thus characterized in that the filtering elements are basically disc-shaped, in particular, circular ring disc-shaped and the inner spaces of the filtering elements stand in connection with the inner space of a hollow shaft through which the filtered liquid is led away. Thus, the filtered liquid passes through the filtering elements and arrives in the inner space of the hollow shaft. Preferably arranged in each filtering element, in the proximity of the hollow shaft, is at least one throughflow opening for the unfiltered liquid. The additional throughflow openings allow the passage of light substances through the filtering element, said light substances being found in the liquid that, due to their low specific gravity, collect in the area of the rotational axis of the filtering elements. Because the filtering elements rotate around their rotational axis during operation, the light substances floating upward in the housing can rise up through all of the filtering elements, and can do so even in those instances where there is only one single throughflow opening in each filtering element.

Another preferred exemplary embodiment of the device is thus characterized in that the throughflow openings in the filtering elements are essentially arranged at an equal radial distance from the hollow shaft in alignment. In particular, when the filtering elements are standing still or are rotating slowly, this ensures a direct throughflow through several filtering elements that are axially spaced apart from one another in their arrangement on the hollow shaft.

Another preferred exemplary embodiment of the device is thus characterized in that the filtering elements are basically designed to be circular ring disc-shaped and the inner spaces of the filtering elements stand in connection with the inner space of a hollow shaft, arranged concentrically to the rotational axis of the filtering elements, via several hollow spokes, spaced apart from one another in the circumferential direction, through which said hollow shaft the filtered liquid is led off. The hollow spokes have a double function. On the one hand, they provide a fluid passage connection between the filtering elements and the hollow shaft. On the other hand, they permit the passage of light substances in the proximity of the hollow shaft in the direction of the rotational axis of the filtering elements.

Another preferred exemplary embodiment of the device is thus characterized in that an additional discharge opening is arranged in the upper face of the housing, in the proximity of the hollow shaft. The additional discharge opening serves the purpose of letting out light substances that have risen to the upper face of the housing by passing through the throughflow openings in the filtering elements or in between and through the spokes, based on their being driven upward. The heavy substances, separated by the rotation of the column of liquid in the direction of the housing wall, whose density is greater than that of the mainstream liquid, can be drawn off through a discharge opening in the housing wall in the proximity of the housing base.

Another preferred exemplary embodiment is thus characterized in that the filtering elements are essentially designed as circular ring disc-shaped and stand in connection with a ring chamber that is concentrically arranged in relation to the rotational axis of the filtering elements, radially outside of the filtering elements. The ring chamber serves to receive the filtered liquid. The arrangement of the receiving space for the filtered liquid, being radially outside of the filtering elements, provides the advantage that the centrifugal forces at work during operation serve to promote the flow of the current into the receiving space. Furthermore, a central throughflow passage is formed radially inside of the filtering elements, said passage ensuring the unhindered upward rising action of the light substances.

Another preferred exemplary embodiment of the device is thus characterized in that filtering elements are connected to a drum in a torsionally secure manner, said drum being rotatably supported in the housing and allowing the filtered liquid to flow through in the area of the filtering elements. The filtering elements can be brought to rotate together via the drum. The throughflow design of the drum in the area of the filtering elements ensures that the filtered liquid can exit out of the filtering elements.

Another preferred exemplary embodiment of the device is thus characterized in that the drum is essentially designed in a circular cylinder shape, and that, on the lower front face of the drum, an inlet port is provided for the liquid, and that, on the upper front face of the drum, an outlet port is provided for light substances. By this arrangement, it is ensured that the light substances will arrive unobstructed at the outlet port based on their upward driven lift.

Another preferred exemplary embodiment of the device is thus characterized in that the inlet port and the outlet port are concentrically arranged in relation to the filtering elements and are used to support the drum. The resulting simple design of the device results in low series production costs. Furthermore, it is advantageous that the drum can be preassembled together with the filtering elements.

Another preferred exemplary embodiment of the device is thus characterized in that, in the lower portion of the housing, a discharge opening is provided radially on the outside, which stands in connection with the interior of the drum. Based on its radially external positioning, the discharge opening serves to permit the discharge of solid substances, filtered out of the liquid, that exhibit a specific density that is greater than that of the liquid.

Further advantages, characteristics and specifics of the invention emerge from the following description, which elaborates on the various design embodiments in detail while referring to the drawings. Shown in:

BRIEF DESCRIPTION OF THE DRAWINGS

FIG. 1 shows a first design embodiment of the device in accordance with the invention, seen in longitudinal cross section;

FIG. 2 shows an individual filtering element from the device illustrated in FIG. 1, seen in top view;

FIG. 3 shows an individual filtering element from the device illustrated in FIG. 1, in accordance with a second design embodiment of the invention, seen in top view;

DETAILED DESCRIPTION

Figures 4, 5:
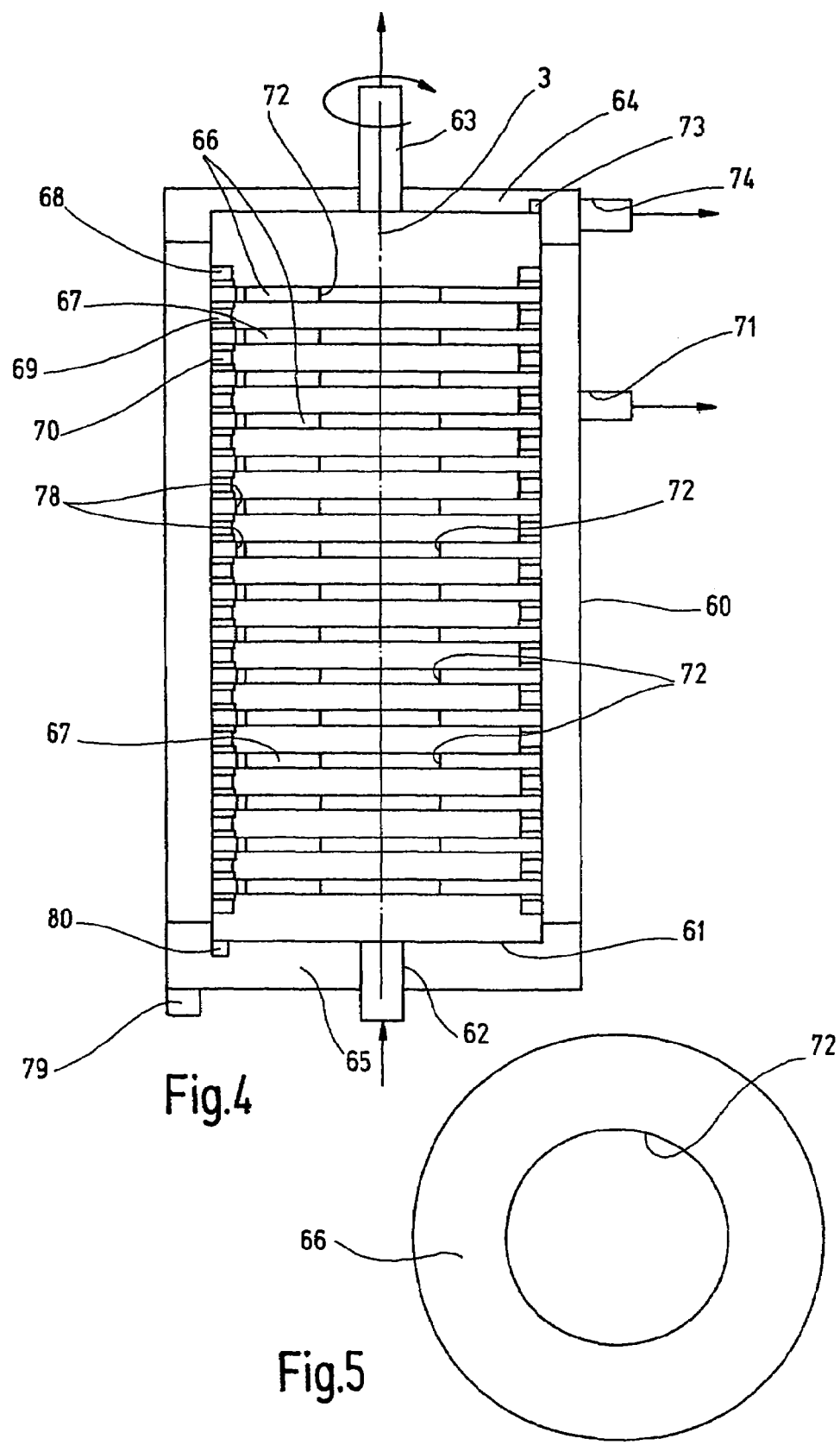
FIG. 4 shows a third design embodiment of the device in accordance with the invention, in longitudinal cross section
FIG. 5 shows an individual filtering element from the device illustrated in FIG. 4, seen in top view.

The device illustrated in FIG. 1 comprises a housing 1, in which a hollow shaft 2 is rotatably taken up around a rotational axis 3. Connected to the hollow shaft 2 are numerous torsionally secure filtering elements 5, 6, and 7, which are all designed in the same manner. In the design embodiment illustrated in FIG. 1, there are 19 filtering elements connected to the hollow shaft 2 in a torsionally secure manner. The hollow shaft 2 can be designed of one piece or comprised of several parts. The filtering elements are comprised of membranes and are hollow on the interior. Through the membranes, liquid can penetrate from the outside into the interior of the filtering elements from where it then arrives at the interior of the hollow shaft by way of suitable openings in the shell surface of the hollow shaft. The filtering elements 5, 6 and 7, are secured by cylindrical shells 10, 11 and 14, in the axial direction. The cylindrical shells 10, 11 and 14 can be equipped with gaskets to seal off the interfacing sites between the filtering elements and the hollow shaft.

The direction of rotation of the hollow shaft 2 with the filtering elements 5, 6 and 7 is indicated by an arrow 16. The lower end 18 of the hollow shaft 2 is designed to be closed and is rotationally supported in a lower cover 20, which seals off the housing 1 on the bottom. By means of screw connections 22 and 23, the lower cover 20 is secured to a flange 25, which, on the outside, is radially secured to the lower edge of the housing 1. In the lower cover 20, there is also an inlet opening 28 provided for a liquid yet to be filtered that is indicated by an arrow 30. In proximity there, a discharge opening 56 is also provided, in the direct vicinity of the housing wall, through which heavy substances, with densities greater than that of the liquid, can be drawn off after separation by rotation and accumulated concentration up against the wall.

The upper end 32 of the hollow shaft 2 is supported in an upper cover 34, which seals the housing 1 off on the top. The upper end 32 forms a discharge opening for the filtered liquid, or the so-called filtrate. The released filtrate is indicated by an arrow 36.

The entering liquid 30 arrives into the interior of the housing 1 by way of the inlet opening 28 and from there, it emerges into the hollow shaft 2 by way of the filtering elements 5, 6 and 7 as a filtrate and exits said hollow shaft through the upper end 32 of the hollow shaft 2.

By means of screw connections 38 and 39, the upper cover 34 is secured to a flange 41 that, on the outside, is radially mounted to the upper edge of the housing 1. In the proximity of the shell surface of the circular cylinder shaped housing 1, a discharge opening 44 is designed in the upper cover 34 for the concentrates yielded by the entering liquid 30. Radially further inward, away from the discharge opening 44, a discharge opening 46 for light substances is designed in the upper cover 34, in the proximity of the hollow shaft 2.

As a result of the rotational movement of the hollow shaft 2 executed during operation and of the torsionally secure filtering elements connected to said shaft, the column of liquid located in the housing 1 is set into circular motion. The centrifugal forces resulting from this ensure that the substances contained in the liquid will wander into the field of the centrifugal forces. Heavier active substances will be transported away in the countercurrent to the lighter substances. Such substances are designated as heavier substances that exhibit a specific density greater than that of the liquid. Other substances are designated as lighter substances that exhibit a specific density lower than that of the liquid. The heavier substances contained in the entering liquid 30 are radially propelled outwards under the operation of the separating device due to their density and they collect in the region of the shell surface of the housing 1, where they can exit through the discharge openings 44, 56 out of the housing 1. The light substances collect on the outer shell surface of the hollow shaft 2 due to their low density. The movement of the heavier substances is effected by a current on the interior of the device, acting from below and rising upward.

According to the current invention, throughflow openings 48 are designed in the circular ring disc-shaped or circular disc-shaped filtering elements 5, 6 and 7. As can be seen in FIG. 1, the throughflow openings 48 are respectively arranged radially equidistant to the rotational axis 3 of the hollow shaft 2. As a result of the rotational movement of the hollow shaft 2 in unison with the filtering elements 5, 6 and 7, it is ensured during the operation of the separating device that light substances, which collect in the region of the hollow shaft 2 due to their low density, will rise upward to the discharge opening 46, and will be able to wander or flow out.

As can be seen in FIG. 2, the individual filtering elements 5 of the separating device illustrated in FIG. 1 are designed as a circular ring disc provided with a central opening 49. The central opening 49 of the internally hollow filtering elements ensures that the filtrate can arrive from the interior of the filtering elements into the hollow shaft 2 via the corresponding openings. The centrifugal forces effect the continuous deportation of the sedimentary deposition (concentration polarization) from the filter surface of the circular disc or circular shaped filtering elements and ensure a continuous and smooth flow through the membrane. The ratio of the filtrate volume to the feed volume determines the concentration of the non-filterable substances in the yield 44, 56.

In FIG. 3, an alternate embodiment form of the filtering element 50 is represented. The filtering element 50 is also designed as a circular ring disc, however, it is provided with a larger central opening 51 than the filtering element 5 represented in FIG. 2. From the central opening 51, hollow spokes 52, 53, 54 and 55 extend outward, which radially run inward and connect the interior of the filtering element 50 to the hollow shaft 2. It is self-evident that in the region of the interfacing sites between the spokes 52 through 55 and the hollow shaft 2, corresponding openings are provided in the hollow shaft 2 which allow the filtrate to pass through. At the same time, the spokes 52 through 55, in a state of integration with the filtering element 50, ensure that the light substances can penetrate unobstructed through the spokes 52 to 55, in the direction of the rotational axis 3 of the hollow shaft 2. This guarantees the nearly unhindered upward rise of light substances in the region of the hollow shaft 2.

In FIG. 4, another design embodiment of a separating device in accordance with the invention is represented. The separating device is comprised of a housing 60, in which a circular cylinder-shaped drum 61 is rotatably mounted. On the lower front face of the drum 61, a hollow open-ended tap 62 is arranged that enables the entry of the liquid to be filtered into the interior of the drum 61. On the upper front face of the drum 61, a hollow open-ended tap 63 is arranged that enables the exit of light substances out of the interior of the drum 61.

The housing 60 is sealed off on the bottom by a base 65 and on the top by a cover 64. The housing 60 is designed in the shape of a circular cylinder, just as the drum 61, and exhibits a somewhat larger diameter than the drum 61. The drum 61 is supported by the hollow taps 62 and 63 in the base 65 of the housing 60 and in the cover 64 of the housing 60.

There is a plurality of filtering elements 66, 67 that are outwardly radially connected with the shell surface of the drum 61 in a torsionally secure manner. The filtering elements 66, 67 are secured in the direction of the rotational axis 3 by means of ring fasteners 68, 69, 70. Furthermore, the ring fasteners 68, 69, 70 also serve to seal off the interfacing sites between the filtering elements 66, 67 and the shell surface of the drum 61. In the region of the filtering elements, the drum allows the filtered liquid to pass through. The filtering elements 66, 67 have the shape of circular ring discs with a central throughflow opening 72, as can specifically be seen in FIG. 5. The central throughflow openings 72 ensure that light substances, which collect in the region of the rotational axis 3 of the drum 61 during the operation of the separating device, are able to rise unobstructed to the discharge opening 63. A discharge opening for heavy substances is radially provided outside on the upper edge of the drum 61 and is designated by 73. Heavy substances arrive into the hollow formed cover 64 via the discharge opening 73 and from there, into a discharge opening 74 that is radially provided on the outside of the cover 64. An additional discharge opening for heavy substances is provided radially on the outside, on the lower edge of the drum 61 and is designated by 80. Heavy substances arrive into the hollow formed base 65 via the discharge opening 80 and from there, into a discharge opening 79 that is radially provided on the outside of the base 65. An additional discharge opening 71 may be provided on the outer surface of the housing 60.

The filtering elements 66, 67 are provided with outward radial throughflow openings 78 running in the direction of the rotational axis 3 of the drum 61. The throughflow openings 78 ensure the passage of solid substances and thus prevent sedimentary clogging of the filtering elements on the radial exterior. In the lower front wall of the drum 61, one or several throughflow openings are radially provided on the outside (not represented here). They allow the passage of solid substances, exhibiting a specific weight that is greater than that of the liquid to be filtered, to pass through at least one discharge opening 79, which is radially arranged on the outside in the lower front wall of the housing 60. The circular ring shaped filtering elements can also be designed as segments in such a manner that gaps allow the passage of solid bodies, or they can be arranged as in turbines.

During the operation of the filtering device represented in FIGS. 1 through 5, a liquid to be filtered, such as a suspension, for example, is fed via a pump through the inlet opening 28, 62 into the housing 1, and into the drum 61. The liquid is drawn in through the filtering elements and is drawn out through the hollow shaft standing in flow association with the filtering elements or via the ring chamber between the drum 61 and the housing 60. Based on the movement of the liquid occurring during the rotation of the filtering elements and on the centrifugal forces effected on the liquid, it is possible to effectively prevent an undesirable buildup of sedimentation on the filtering elements. The transmembrane pressure required for filtration can be implemented, for example, by the application of a negative pressure on the filtrate side or by the application of a positive pressure on the inlet opening of the separating device. Furthermore, it is beneficial to use the hydrostatic or hydrodynamic pressure present in many of the water treatment systems for the purpose of generating the required transmembrane pressure and suitable for the application of the described separating device. Modern water treatment plants exhibit, for example, aeration reactors as tall as 20 meters in which a transmembrane gradient pressure of nearly 2 bars can be generated by hydrostatic pressure.

The filtering elements can be designed as hollow bodies or as hollow frames exhibiting membranes or covered over by membranes. To this end, conventional industrial membrane applications from ultrafiltration membrane technology can be used such as for example, polymer membranes, membrane filters, ultrafiltration membranes, microfiltration membranes or nanofiltration membranes.

The hollow shaft 2 represented in FIG. 1 can be constructed of one piece or from several parts comprised of various hollow sections, for example in the shape of a cylinder, whereby the various sections of the hollow shaft are separated by filtering elements interposed between said sections, in particular by filtering discs, and said sections being interconnected by the latter discs are impermeable to the liquid yet to be filtered. It remains essential that, between the interior of the hollow shaft, or between the interior of the ring chamber, between the drum and the housing, a fluid continuum be established in the form of at least one opening that makes it possible for the filtrate to pass through.

The separating or the filtering device can be used in aerobic as well as anaerobic operating systems, for example for the treatment of waste water or for water purification systems. The filtering device can, for example, be integrated in the activated sludge stage of a sewage treatment plant and represents a modern system for biomass hold-up and therefore, for the enrichment of the biomass. It is self-evident that the filtering device can also be applied in the resolution of the sewage feed headed for the sewage treatment plant after or in place of preliminary clarification. This permits the separation of the feed into a carbon-rich concentrate, which can be anaerobically converted to biogas and into a carbon-poor filtrate, which can be aerobically converted in high performance wastewater reactors for example. Of course, it is also possible to use the filtering device to obtain drinking water from surface waters. The separating device can also be indicated for use in installations in which air or gas is introduced, thus making an aerobic mode of operation possible.

Preferably, the housing 1, 60 essentially has the shape of a circular cylinder whose longitudinal axis, preferably in the vertical direction, is arranged perpendicular to a horizontal foundation. The rotational axis of the filtering elements is also preferably oriented in a vertical direction as well, thus perpendicular to a horizontal foundation. Furthermore, the inlet opening 28, 62 into the housing 1 and into the drum 61 is arranged in the base of the housing 1 or in the lower cover 20 or in the lower front face of the drum 61. This configuration ensures that light substances contained in the housing 1 or in the drum 61 will rise parallel or alongside the rotational axis 3 of the filtering elements. In accordance with the invention, the nearly unobstructed ascent of light substances is made possible by the throughflow openings 48, the spokes 52 through 55 and/or by the central throughflow openings 72.

The invention claimed is:

1. A device for the separation of substances from a liquid comprising:
    a housing having a first end and a second end opposite the first end;
    a hollow shaft extending generally between the first end and the second end of the housing and generally along the center of the housing, the hollow shaft being rotatable about a rotational axis extending through the center of the hollow shaft;
    a plurality of generally disc shaped filtering elements disposed in the housing and attached to the hollow shaft so as to be rotatable in conjunction with the shaft, the filtering elements comprising an outer surface and an inner space, the inner spaces being fluidly connected to the hollow shaft so as to allow a filtered liquid to pass through the outer surfaces and through the inner space and into the hollow shaft;
    wherein at least one throughflow opening is provided in the filtering elements in the proximity of the hollow shaft configured for allowing substances with a density lower than that of the liquid to flow past the filtering elements; and
    wherein the hollow shaft defines a discharge opening for the filtered liquid;
    wherein the housing comprises an inlet configured for ingress of the liquid, a first outlet configured for egress of heavy substances, and a second outlet configured for egress of light substances, and wherein the first outlet and the second outlet are both disposed on the first end of the housing; and
    wherein the first outlet is disposed near the outer diameter of the first end of the housing and wherein the second outlet is disposed near the hollow shaft.

2. The device in accordance with claim 1, wherein the inlet is disposed on the second end of the housing.

3. The device in accordance with claim 2, wherein the at least one throughflow opening comprises a plurality of throughflow openings, and wherein the throughflow openings in the filtering elements are essentially arranged to be radially equidistant to the hollow shaft.

4. The device in accordance with claim 1, wherein the filtering elements are ring-shaped discs.

5. A device for the separation of substances from a liquid comprising:
    a device configured for separating a liquid into a first filtered liquid, a second liquid having a density, and a third liquid having a density which is greater than the density than the second liquid; the device comprising:
    a housing having a first end and a second end;

a plurality of generally disc shaped filtering elements disposed within the housing so as to be rotatable within the housing, the filtering elements having outer surfaces and inner spaces and being configured for allowing filtered liquid to pass through the outer surfaces and into the inner spaces;

a hollow shaft disposed between the first end and the second end of the housing and having the plurality of filtering elements attached thereto, the hollow shaft having an inner space disposed in communication with the inner spaces of the filtering elements such that the first filtered liquid passes from the inner spaces of the filtering elements to the inner space of the hollow shaft, the hollow shaft being rotatable within the housing in conjunction with the filtering elements;

wherein the filtering elements have at least one throughflow opening proximate to the hollow shaft configured for allowing substances with a density lower than that of the third liquid to flow past the filtering elements; and wherein the hollow shaft defines an outlet for the first filtered liquid, and wherein the housing comprises an inlet for the liquid which is to be separated disposed on the first end of the housing, a first discharge outlet for discharging the second fluid disposed on the second end of the housing, and a second discharge outlet for discharging the third fluid disposed on the second end of the housing; and wherein the first discharge outlet is disposed adjacent the hollow shaft and the second discharge outlet is disposed adjacent the outside diameter of the housing.

6. A device for the separation of substances from a liquid, the device comprising:

a plurality of filtering elements configured for rotating around an essentially vertically arranged rotational axis, said filtering elements being configured to allow filtered liquid to pass through and which are rotatably supported around the rotational axis in a housing, said housing having a first end and a second end opposite the first end, the housing having a lower inlet opening for the ingress of said liquid disposed on the first end of the housing, a first discharge opening disposed on the second end of the housing adjacent the outside diameter of the housing and configured for discharging the heavy substances separated by rotation, a second discharge opening disposed on the second end of the housing adjacent a central axis of the housing, said axis extending between the first and second end of the housing, and configured for discharging the light substances separated by rotation, and a filter discharge opening for filtered liquid, wherein the filtering elements, in the region or in the proximity of the rotational axis of the filtering elements, have at least one throughflow opening through which substances exhibiting a density lower than that of the liquid rise upward, counter to the gravitational force.

7. The device in accordance with claim 6, wherein the filtering elements are essentially designed as circular ring disc shaped and stand in connection with a ring chamber, said ring chamber being arranged concentrically relative to the rotational axis of the filtering elements, radially outside of the filtering elements.

8. The device in accordance with claim 6, wherein the filtering elements are torsionally securely connected with a drum, said drum being rotatably mounted in the housing and allowing, in the area of the filtering elements passage of the filtered liquid.

9. The device in accordance with claim 8, wherein the drum is essentially cylinder shaped having a lower end and an upper end, and wherein an inlet port for the fluid is provided on the lower end as an inlet opening and an outlet port is provided on the upper end as a discharge opening for the light substances.

10. The device in accordance with claim 9, wherein the inlet port and the outlet port are arranged concentrically relative to the filtering elements and are used for supporting the drum.

11. The device in accordance with 8, wherein, in the lower region of the housing, a third discharge opening is provided radially on the outer side, said discharge opening standing in connection with the interior of the drum.

12. A process for the separation of substances from a liquid, by means of a device with several rotatable filtering elements arranged around a rotational axis and in stacked formation, said filtering elements allowing the filtered liquid to pass through, the process comprising introducing liquid into the device through a fluid inlet disposed on a first end of the device, collecting between the filtering elements in the area of the rotational axis lower density substances which do not pass through the filtering elements and which exhibit a density lower than that of the fluid, allowing said lower density substances to pass by the filtering elements via at least one throughflow opening provided in the filtering elements, discharging said lower density substances through a first discharge outlet disposed on a second end of the device opposite the first end of the device, said first discharge outlet being disposed adjacent the rotational axis of the filtering elements, collecting a higher density substance proximate the outer diameter of the filtering elements, discharging said higher density substance through a second discharge outlet disposed on the second end of the device, said second discharge outlet being disposed adjacent the outer diameter of the filtering elements, and collecting the filtered liquid which passes through the filtering elements and discharging said filtered liquid through a third discharge outlet.

\* \* \* \* \*